United States Patent [19]

Wurst et al.

[11] 4,156,397

[45] May 29, 1979

[54] POWER LIMITING ARRANGEMENT IN A SEWING MACHINE

[75] Inventors: John W. Wurst, Dover; Philip F. Minalga, Piscataway, both of N.J.

[73] Assignee: The Singer Company, New York, N.Y.

[21] Appl. No.: 937,235

[22] Filed: Aug. 28, 1978

[51] Int. Cl.² ............................................. D05B 3/02
[52] U.S. Cl. .................................................. 112/158 E
[58] Field of Search .................. 112/158 E, 275, 277, 112/220; 318/635

[56] References Cited

U.S. PATENT DOCUMENTS

| | | | |
|---|---|---|---|
| 3,369,160 | 2/1968 | Koppel et al. | 318/635 X |
| 4,016,821 | 4/1977 | Minalga | 112/158 E |
| 4,108,093 | 8/1978 | Watanabe et al. | 112/158 E |

FOREIGN PATENT DOCUMENTS

| | | | |
|---|---|---|---|
| 2542027 | 4/1976 | Fed. Rep. of Germany | 112/277 |
| 2551133 | 5/1977 | Fed. Rep. of Germany | 112/277 |

*Primary Examiner*—Peter Nerbun
*Attorney, Agent, or Firm*—David L. Davis; Robert E. Smith; Edward L. Bell

[57] ABSTRACT

A sewing machine is disclosed in which electromechanical actuators are incorporated. By selectively supplying power to position the electromechanical actuators, the stitch forming instrumentalities of the sewing machine may be operatively controlled. In order to reduce heat dissipation within the sewing machine under abnormal conditions where the actuators are locked for long periods of time, the sewing machine main drive motor motion is monitored. After a predetermined period of inactivity of the sewing machine main drive motor, the power which can be supplied to the actuators is limited.

10 Claims, 2 Drawing Figures

POWER LIMITING ARRANGEMENT IN A SEWING MACHINE

BACKGROUND OF THE INVENTION

This invention relates to sewing machines and, more particularly, to sewing machines having stitch forming instrumentalities operatively controllable by supplying power to position respective electromechanical actuators.

Sewing machines are known in the prior art wherein the positional coordinates for successive stitch penetrations are stored in a memory having addressable locations corresponding to a plurality of operator selectable patterns. In particular, a system is disclosed in U.S. Pat. No. 4,016,821, issued on Apr. 12, 1977, wherein logic circuitry is used to select and release the stitch pattern information stored in the memory in timed relation with the operation of the sewing machine. Digital information from the memory is converted to positional analog signals which control closed loop servo systems including moving coil linear actuators directly controlling the position of conventional stitch forming instrumentalities of the sewing machine to reproduce a pattern of stitches corresponding to the selected stitch information. Another system is disclosed in U.S. Pat. No. 3,847,100, issued Nov. 12, 1974, wherein a solenoid is utilized as an actuator for a skip stitch mechanism effective to suspend needle reciprocation. In both of these prior systems, the actuators operate independently fom the main drive motor of the sewing machine. Under certain abnormal operating conditions, undesirably high power may be applied to the actuators although the main drive motor is not operating and stitches are not being formed. During such time, due to the relatively high continuous current applied to the actuators, the actuators are subject to overheating and further, the interior of the sewing machine casing experiences a rise in temperature. It is therefore an object of the present invention to reduce operating temperatures and heat dissipation of the sewing machine actuators when the sewing machine main drive motor is not operating.

One way of accomplishing the foregoing object would be to remove power from the actuators when the sewing machine main drive motor is not operating. However, this is not a desirable approach because, for example, the actuator controlling the lateral position of the needle should maintain its position so as to resist the needle being moved in the process of changing or threading it. It is therefore another object of this invetion to reduce the operating temperatures and heat dissipation of the sewing machine actuators when the sewing machine main drive motor is not operating without entirely removing power therefrom.

It is a further object of this invention that the sewing machine operator not be aware of any such power limitation if the sewing machine is operating normally.

SUMMARY OF THE INVENTION

The foregoing and additional objects are attained in accordance with the principles of this invention in a sewing machine having a stitch forming instrumentality operatively controllable by supplying power to position an electromechanical actuator, by providing means for sensing operation of the sewing machine and providing a signal representative thereof, and power limiting means responsive to the absence of the signal for a predetermined time interval for placing an upper limit on the power supplied to the actuator.

In accordance with an aspect of this invention, the power limiting means is only operative under a condition wherein power above a predetermined level is supplied to the actuator.

BRIEF DESCRIPTION OF THE DRAWINGS

The foregoing will be more readily apparent upon reading the following description in conjunction with the drawing in which.

DETAILED DESCRIPTION

Figure 1:
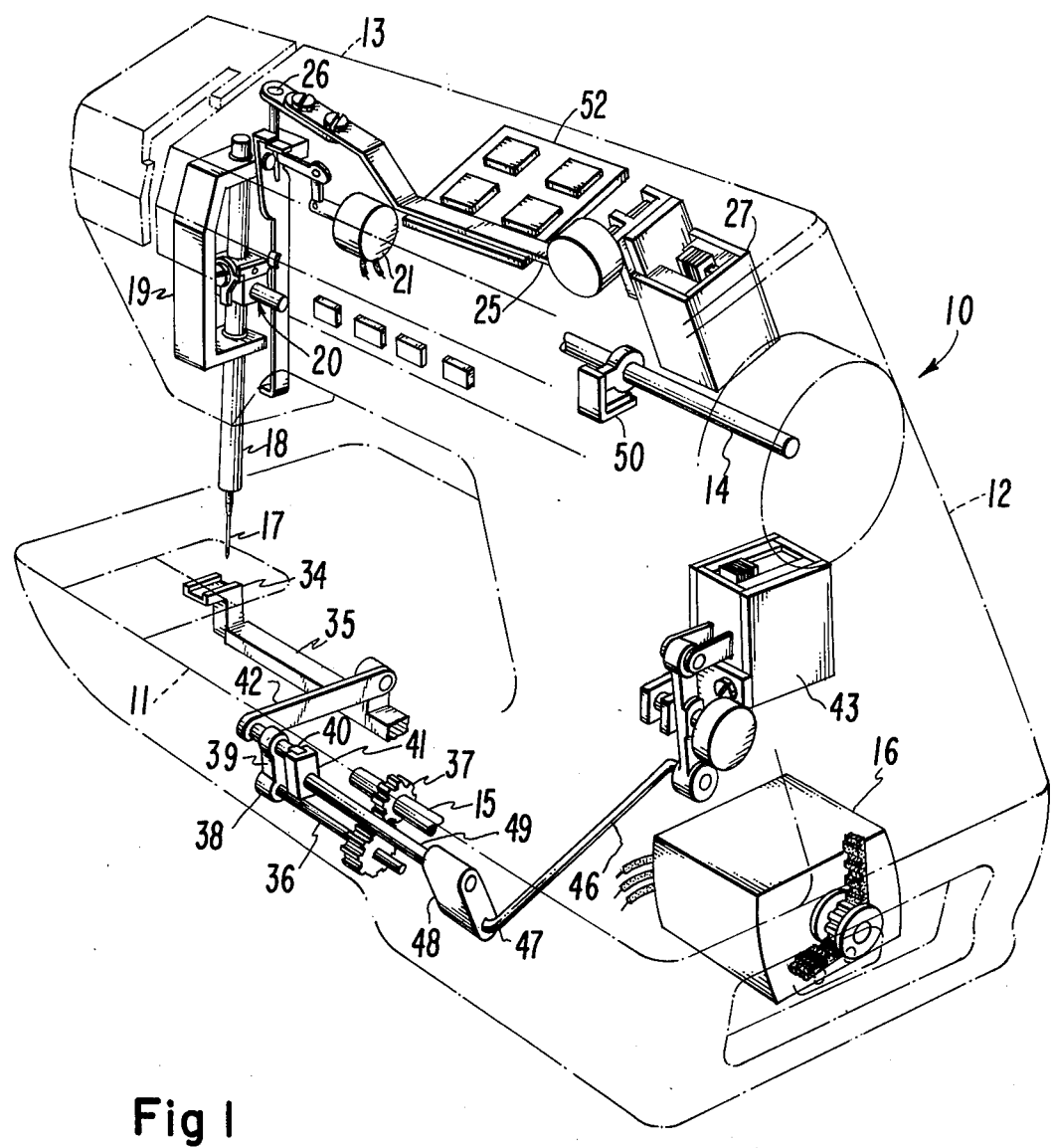
FIG. 1 is a perspective view of a sewing machine in which an arrangement constructed in accordance with the principles of this invention may be incorporated.

Referring to the drawings, as shown in phantom lines in FIG. 1, a sewing machine casing 10 includes a bed 11, a standard 12 rising from the bed 11 and a bracket arm 13 overhanging the bed 11. The driving mechanism of the sewing machine includes an arm shaft 14 and a bed shaft 15 interconnected in timed relation by a conventional drive mechanism (details not shown) including a drive motor 16. A needle 17 is carried for endwise reciprocation by a needle bar 18 mounted for lateral jogging movement in a gate 19 in the bracket arm 13. The connections between the arm shaft 14 and the needle bar 18 for imparting needle reciprocation include a separable connection indicated generally at 20 which is referred to in the art as a skip stitch mechanism, the details of which will be found in the aforereferenced U.S. Pat. No. 3,847,100. The skip stitch mechanism 20 is operatively connected to a needle bar release solenoid 21. When the solenoid 21 is energized momentarily it will influence interruption of needle bar reciprocation and will thus cause a stitch to be skipped. This skip stitching may be effected under a plurality of conditions, as will be described in more detail hereinafter.

For imparting lateral jogging movement to the needle 17, a drive link 25 is pivoted as at 26 to the gate 19 and provides the mechanical connection to a reversible linear actuator 27, illustratively of the type described in U.S. Pat. No. 4,016,441, issued Apr. 5, 1977. The linear actuator 27 may therefore be controlled to determine the lateral position of the sewing needle 17.

Also illustrated in FIG. 1 is a fragment of a work feed mechanism including a feed dog 34 carried by a feed bar 35. The mechanism illustrated for imparting work transporting movement to the feed dog 34 includes a feed drive shaft 36 driven by gears 37 from the bed shaft 15, a cam 38 on the feed drive shaft 36, and a pitman 39 embracing the cam 38 and connected to reciprocate a slide block 40 in a slotted feed regulating guideway 41. A link 42 pivotably connects the pitman 39 with the feed bar 35 so that depending upon the inclination of the guideway 41, the magnitude and direction of the feed stroke of the feed dog 34 will be determined. The inclination of the guideway 41 may be controlled by a reversible linear actuator 43, illustratively of the same type as the linear actuator 27. The linear actuator 43 is connected to a link 46 pivoted at 47 to a rock arm 48 which is secured on a rock shaft 49 to which the guideway 41 is affixed.

Also shown in FIG. 1 is a timing pulse generator 50 which may be of the type shown and described in U.S. Pat. No. 3,939,372. The pulse generator 50 provides a train of timing pulses, one for each rotation of the arm shaft 14, which pulses are utilized in a manner to be described hereinafter.

Figure 2:
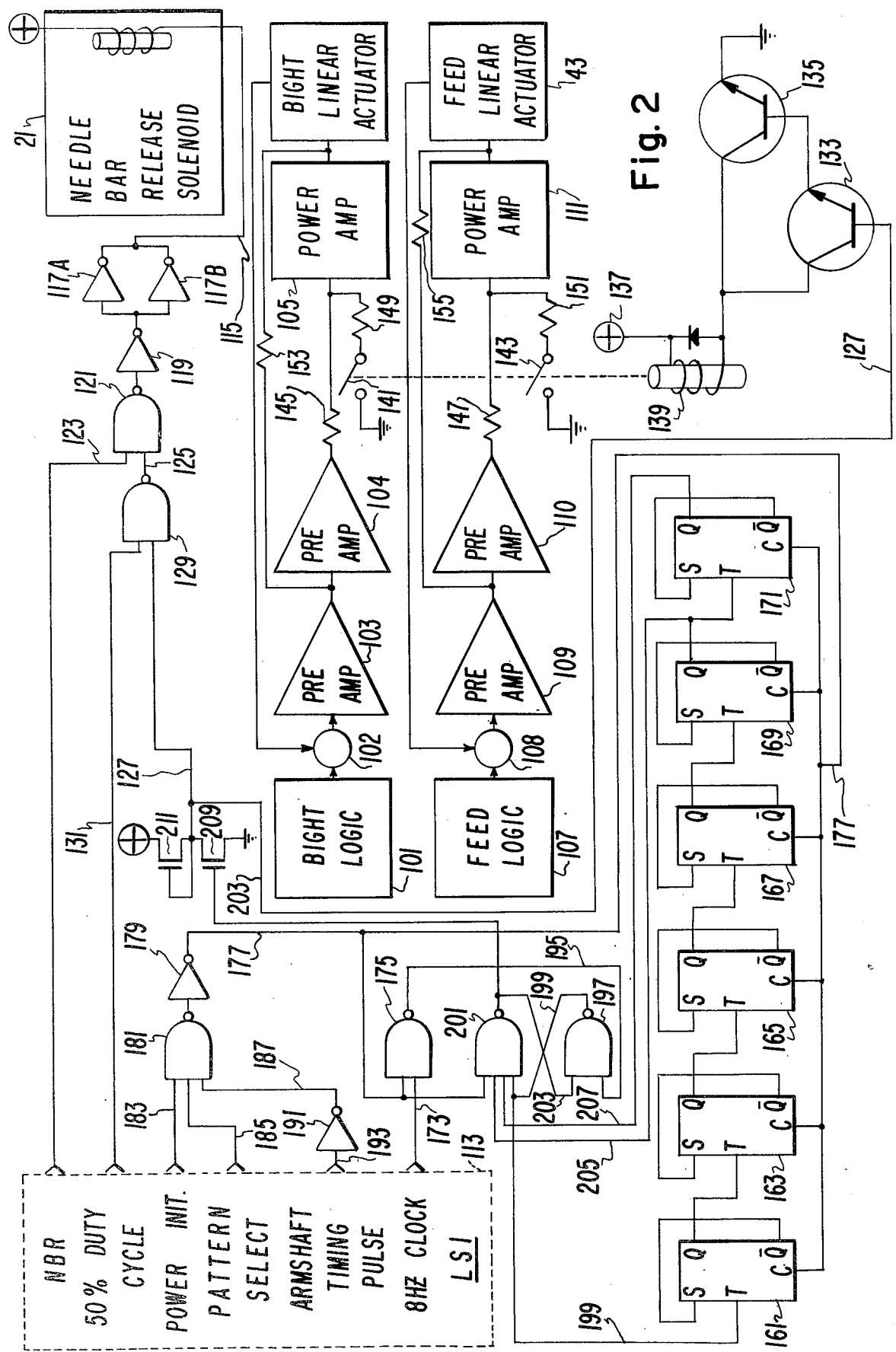
FIG. 2 is a block schematic diagram of illustrative circuitry constructed in accordance with the principles of this invention.

Referring now to FIG. 2, depicted therein is illustrative circuitry which may be utilized in practicing this invention to limit the power applied to the needle bar release solenoid 21, the bight linear actuator 27 and the feed linear actuator 43, during periods of machine inactivity. Also shown in FIG. 2 is circuitry for controlling the bight linear actuator 27 and the feed linear actuator 43 during the formation of stitches in a preselected pattern. All of the circuitry in FIG. 2 may be mounted on a printed circuit board 52 (FIG. 1) within the sewing machine casing 10. The control circuitry for the bight linear actuator 27 includes a bight logic circuit 101 which supplies position signals to a summing junction 102 having as another input a signal representative of the actual position of the bight linear actuator 27. The output of the summing junction 102 is thus an error signal which is applied to the input of a preamplifier 103. The output of the preamplifier 103 is applied to a power stage including a preamplifier 104 and a power amplifier 105, which controls the positioning of the bight linear actuator 27. Similarly, the control circuitry for the feed linear actuator 43 includes a feed logic circuit 107 which supplies position signals to a summing junction 108 having as another input a signal representative of the actual position of the feed linear actuator 43. The output of the summing junction 108 is thus an error signal which is applied to the input of a preamplifier 109. The output of the preamplifier 109 is applied to a power stage including a preamplifier 110 and a power amplifier 111, which controls the positioning of the feed linear actuator 43. The bight logic circuit 101 and the feed logic circuit 107 receive input signals from the output of a read-only-memory (ROM) which stores stitch pattern coordinates for a plurality of operator selectable patterns, as is well known in the art as illustratively described in the above-mentioned U.S. Pat. No. 4,016,441. This ROM is part of a large scale integrated (LSI) circuit 113 which also includes logic circuitry reponsive to pattern selection by an operator and timing pulses from the timing pulse generator 50 to provide signals for retrieving stitch pattern coordinate information from the ROM, as well as other control functions, only the pertinent ones of which will be described hereinafter.

Skip stitching is effected at various times, including at the start of a pattern, after a "single pattern" has been executed, during basting, and during double feed. Under these circumstances, the needle bar release solenoid 21 is energized. The needle bar release solenoid 21 is energized by applying a low signal to the lead 115. The lead 115 is coupled to the output of a pair of open collector circuits 117A and 117B connected in parallel, which function as buffers between the solenoid 21 and the remainder of the logic circuitry. The logic input to the amplifiers 117A and 117B is provided through an inverter 119 coupled to the output of a NAND gate 121. The NAND gate 121 has a normally high output due to a normally low signal on its input lead 123. The NAND gate 121 further has a normally high signal on its input lead 125, as will be described in more detail hereinafter. This condition provides an open circuit condition on the lead 115 which maintains the needle bar release solenoid 21 in an unenergized state. When it is desired to energize the needle bar release solenoid 21 for skip stitching, the LSI 113 provides a high needle bar release (NBR) signal on the lead 123, which causes the output of the NAND gate 121 to go low, causing a high signal to appear at the output of the inverter 119, which in turn results in a low signal on the lead 115, energizing the needle bar release solenoid 21.

In accordance with the principles of this invention, circuitry is provided for sensing that the sewing machine main drive motor 16 is inoperative for a predetermined period of time, illustratively six seconds. When such a condition is detected, the circuitry causes the power supplied to the needle bar release solenoid 21, if energized, to be limited. Also, if the sewing machine is operating under an abnormal condition, as will be described in more detail hereinafter, the power supplied to the bight linear actuator 27 and the feed linear actuator 43 is limited. If the sewing machine is operating normally, power to the bight linear actuator 27 and the feed linear actuator 43 is not reduced, thereby permitting those actuators to maintain their positions.

In a manner to be described in full detail hereinafter, detection of the six second period of inactivity of the main drive motor 16 results in a high signal being applied to the lead 127. The other input to the NAND gate 129 is a high frequency, illustratively 25 kilohertz, 50% duty cycle signal on the lead 131 from the LSI 113. With a high signal on the lead 127 and a signal on the lead 131 which is high only 50% of the time, the signal on the lead 125 is high 50% of the time. When the NBR signal on the lead 123 is high, indicating that the needle bar release solenoid 21 is to be energized, and there is a 50% high/low signal on the lead 125, the signal level on the lead 115 is low 50% of the time. The frequency of this signal is sufficiently high so that the needle bar release solenoid 21 will remain energized without "chattering". The 50% decrease in average applied voltage to the needle bar release solenoid 21 will result in a reduction of the power dissipated by the needle bar release solenoid 21 to 25% of the continuous energization power.

The high signal on the lead 127, resulting from detecting the six second period of inactivity of the main drive motor 16, is also applied to the base of the transistor 133. The transistor 133 is in a Darlington configuration with the transistor 135. With a high signal on the lead 127, the transistors 133 and 135 conduct, providing a path for current to flow from the voltage source 137 through the relay coil 139. The relay 139 includes two normally open contacts 141 and 143. The preamplifier 104 is coupled to the power amplifier 105 through a resistor 145. Similarly, the preamplifier 110 is coupled to the power amplifier 111 through a resistor 147. The relay contact 141 is connected in a path including the resistor 149, which path goes between ground and the junction between the resistor 145 and the input to the power amplifier 105. Similarly, the relay contact 143 is connected in a path including the resistor 151, which path goes between ground and the junction between the resistor 147 and the input to the power amplifier 111. When the relay 139 is energized as a result of the high signal being applied to the lead 127, the relay contacts 141 and 143 close, completing the paths to ground including the resistors 149 and 151, respectively. These paths have the effect of placing voltage dividers intermediate preamplifiers 104 and 110 and power amplifiers 105 and 111, respectively. Illustratively, the resistors 145 and 147 each have a value of 430 ohms and the resistors 149 and 151 each have a value of 160 ohms. Therefore, with the relay contacts 141 and 143 closed, the input voltages to the power amplifiers 105 and 107 are reduced to approximately 27.2% of the output voltages of the preamplifiers 104 and 110, respectively. If the sewing machine is operating normally, the actuators 27 and 43 will be positioned properly so that essentially zero error signals are provided to the preamplifiers 104 and 110, respectively. In such case, insertion of the resistors 149 and 151 has negligible effect and the power and heat dissipation are not reduced. Further, the sewing machine operator will not detect any change. However, under certain abnormal operating conditions large error signals may be generated and the respective actuators may be unable to move. For example, if power is applied to the sewing machine with the needle penetrating a work fabric and the needle in a wide bight position, the circuitry will attempt to center the needle. Further, if power is applied to the sewing machine with the feed dogs above the throat plate and the presser foot lowered against the feed dogs, the circuitry will attempt to move the feed dogs. Under these conditions, relatively large error signals are generated. The feedback paths between the outputs of the power amplifiers 105 and 111 and the inputs of the preamplifiers 104 and 110, respectively, include respective resistors 153 and 155 which set the gain of the power stages. Insertion of the resistors 149 and 151 therefore functions to place an upper limit on the maximum voltage which can be applied to the actuators 27 and 43. This upper limit is approximately 27.2% of the power supply voltage, thereby reducing the maximum heat dissipation.

In order to detect the six second period of inactivity of the sewing machine main drive motor 16, a timer is provided. This timer consists of a six stage counter constructed of toggle flip-flops 161, 163, 165, 167, 169 and 171. The flip-flops 161–171 count pulses from an eight hertz clock provided on the lead 173 by the LSI 113. The pulses on the lead 173 are applied as one input to a NAND gate 175. The other input of the NAND gate 175 is on the lead 177, the output of an inverter 179, whose input is connected to the output of a NAND gate 181. The NAND gate 181 has three inputs; i.e. the leads 183, 185 and 187. The lead 183 receives a power initialization signal from the LSI 113. This power initialization signal is normally high and is a single low going pulse when power is first applied to the sewing machine. The signal on the lead 185 is a pattern selection signal from the LSI 113. The pattern selection signal is normally high and is a single low going pulse whenever a new pattern is selected. The signal on the lead 187 is the output of an inverter 191 which receives an input signal over the lead 193 from the LSI 113. The signal on the lead 193 is an arm shaft timing pulse derived from the pulse generator 50 (FIG. 1). The pulse on the lead 193 is a high going pulse provided once per revolution of the arm shaft 14, corresponding to operation of the sewing machine main drive motor 16. This pulse on the lead 193 is converted to a low going pulse on the lead 187. Thus, the signal on the lead 177 is normally high but goes low under three circumstances:

1. When power is initially applied to the sewing machine, a low going pulse appears on the lead 177;

2. When a new pattern is selected, a low going pulse appears on the lead 177; and 3. During operation of the sewing machine main drive motor 16 a train of low going pulses appears on the lead 177.

A low going pulse on the lead 177 functions to clear the flip-flops 161–171, thereby resetting the six second timer. When the signal on the lead 177 is high, this enables the NAND gate 175 to pass the eight hertz clock on the lead 173 to the lead 195, one of the inputs to the NAND gate 197. The output of the NAND gate 197 on the lead 199 provides counting pulses for the flip-flops 161–171. The other input to the NAND gate 197 is the output of the NAND gate 201 on the lead 203. With a high signal on the lead 203, the eight hertz clock pulses cause counting to occur. The lead 203 is high if any of the four inputs to the NAND gate 201 are low. These four inputs are the leads 177 and 179, already discussed, plus the leads 205 and 207, the outputs of the flip-flops 169 and 171, respectively. When the signals on the leads 205 and 207 are high, this indicates that the six stage flip-flop counter has reach a count of 48. Since an eight hertz clock is being counted, a count of 48 is equivalent to a six second time interval. Thus, if a six second time interval elapses without a low going pulse appearing on the lead 177, the signal on the lead 203 goes low. This condition results in the counting being terminated due to the NAND gate 197 being disabled. Also, a high signal is applied to the lead 127, due to the switching action of depletion devices 209 and 211. The high signal on the lead 127 results in power being limited to the needle bar release solenoid 21 and the actuators 27 and 43, as described hereinabove.

The foregoing condition persists until either a new pattern is selected, causing a low going pulse to appear on the lead 185, or the sewing machine main drive motor 16 is operated, causing an arm shaft timing pulse to appear on the lead 193. In either case, a low going pulse appears on the lead 177, causing a high signal to appear on the lead 203, restarting the six stage counter and returning full power application to the needle bar release solenoid 21 and the actuators 27 and 43.

Accordingly, there has disclosed an arrangement for limiting power to the electromechanical actuators in a sewing machine during periods of inactivity of the sewing machine. It is understood that the above-described arrangement is merely illustrative of the application of the principles of this invention. Numerous other arrangements may be devised by those skilled in the art without departing from the spirit and scope of this invention, as defined by the appended claims.

We claim:

1. In a sewing machine having a stitch forming instrumentality operatively controllable by supplying power to position an electromechanical actuator:
   means for sensing operation of the sewing machine and providing an operation signal representative thereof; and
   power limiting means responsive to the absence of said operation signal for a predetermined time interval for placing an upper limit on the power supplied to said actuator.

2. The sewing machine according to claim 1 wherein said sensing means includes means for detecting the revolution of the sewing machine main drive motor and providing said operation signal in timed relation thereto.

3. The sewing machine according to claim 1 wherein a plurality of operator selectable patterns may be sewn and said sensing means includes means responsive to operator selection of a pattern for providing said operation signal.

4. The sewing machine according to claim 1 wherein said sensing means includes means responsive to power being applied to said sewing machine for providing said operation signal.

5. The sewing machine according to claims 2, 3 or 4 wherein said power limiting means includes:
   clock means for providing clock pulses at a fixed frequency;
   counter means for counting said clock pulses;
   means responsive to said counter means reaching a predetermined count for reducing said power; and
   means responsive to said operation signal for resetting said counter means.

6. The sewing machine according to claim 1 wherein said power limiting means includes means for duty cycle modulating the voltage applied to said actuator.

7. The sewing machine according to claim 1 wherein said power limiting means includes voltage divider means selectively connectable in a power supplying path for said actuator.

8. The sewing machine according to claim 7 wherein said voltage divider means includes:
   a first resistor serially connected in said path;
   a second resistor connected between a reference voltage and the end of said first resistor electrically closest to said actuator;
   normally open switch means connected in series with said second resistor; and
   means responsive to the absence of said operation signal for said predetermined time interval for closing said switch means.

9. The sewing machine according to claim 1 wherein said power limiting means is only operative under a condition wherein power above a predetermined level is supplied to said actuator.

10. The sewing machine according to claim 9 wherein said actuator is a needle bar release solenoid, said predetermined power level is zero power, and said power limiting means includes means for duty cycle modulating the voltage applied to said solenoid.

* * * * *